(12) United States Patent
Dixon et al.

(10) Patent No.: US 12,739,542 B2
(45) Date of Patent: Sep. 15, 2026

(54) SPEAKER SYSTEM HAVING MOUNTING BRACKETS

(71) Applicant: Harman International Industries, Incorporated, Stamford, CT (US)

(72) Inventors: David Dixon, Grosse Pointe, MI (US); Jose Tomas DeLuna, Canton, MI (US); Jeffery Fay, Brighton, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 683 days.

(21) Appl. No.: 18/071,793

(22) Filed: Nov. 30, 2022

(65) Prior Publication Data

US 2024/0179441 A1 May 30, 2024

(51) Int. Cl.
*H04R 1/02* (2006.01)
*B60R 11/02* (2006.01)

(52) U.S. Cl.
CPC ............ *H04R 1/025* (2013.01); *H04R 1/026* (2013.01); *B60R 11/0217* (2013.01); *H04R 2499/13* (2013.01)

(58) Field of Classification Search
CPC ..... H04R 1/025; H04R 1/026; H04R 2499/13
See application file for complete search history.

(56) References Cited

U.S. PATENT DOCUMENTS

| | | | | |
|---|---|---|---|---|
| 6,690,802 B2 * | 2/2004 | Stickles | H04R 27/00 381/387 |
| 10,040,403 B2 * | 8/2018 | McFadden | B60R 9/058 |
| 10,486,613 B2 | 11/2019 | White et al. | |
| 11,223,886 B1 * | 1/2022 | Fadul | H04R 1/023 |
| 2003/0001055 A1 * | 1/2003 | Harary | H04R 5/02 248/221.11 |

OTHER PUBLICATIONS

Kyle Martin Tech; New GoPro Handlebar and Large Tube Mount: Jan. 21, 2017; YouTube; Timestamp 4:29 or pp. 1-2 (Year: 2017).*

* cited by examiner

*Primary Examiner* — Vivian C Chin
*Assistant Examiner* — Annabelle Kang
(74) *Attorney, Agent, or Firm* — Burris Law, PLLC

(57) ABSTRACT

A speaker system includes a speaker and a mounting bracket. The mounting bracket includes a cleat and a clamp. The cleat is configured to be mounted to the speaker in a plurality of mounting positions. The clamp slidably engages the cleat among a plurality of positions. The clamp includes end portions and a connecting portion. The end portions are spaced apart from each other and engage the cleat. The connecting portion is disposed between the end portions and is configured to receive a support bar.

20 Claims, 9 Drawing Sheets

100
112b
108a
112a
108

174
126
156
174
154b
158
154a
100
166
172
170
106
172
148
160
150a
150b
112a
136a
140a
136
140
128a
134
129
128c
124
132
146
130
128b
144
108a
114a
114b
164
108
108b 112a
142
142
142
142
108b
142
100
108
108a
142
142
142
112b

SPEAKER SYSTEM HAVING MOUNTING BRACKETS

FIELD

The present disclosure relates to a speaker system having mounting brackets.

BACKGROUND

The statements in this section merely provide background information related to the present disclosure and may not constitute prior art.

Auxiliary sound systems such as an add-on speaker system made for all terrain vehicles (ATVs), utility terrain vehicles (UTVs), watercrafts, and motorcycles, for example, generally lack mounting versatility. Furthermore, most auxiliary sound systems are quite large, bulky, and unattractive. Some require the removal of and/or an addition of an entire roof, making them difficult and costly to install. Moreover, most auxiliary sound systems are vehicle specific and, thus, are not versatile to different types of vehicles. Lastly, many conventional auxiliary sound systems have the speakers emitting sound from a specific direction (e.g., emitting sound directly down on the user's head), so the perception of sound quality is poor.

These issues with auxiliary sound systems, among other issues with auxiliary sound systems, are addressed by the present disclosure.

SUMMARY

This section provides a general summary of the disclosure and is not a comprehensive disclosure of its full scope or all of its features.

In one form, the present disclosure provides a speaker system that includes a speaker and a mounting bracket. The mounting bracket includes a cleat and clamp. The cleat is configured to be mounted to the speaker in a plurality of mounting positions. The clamp slidably engages the cleat among a plurality of positions. The clamp includes end portions and a connecting portion. The end portions are spaced apart from each other and engage the cleat. The connecting portion is disposed between the end portions and is configured to receive a support bar.

In variations of the speaker system of the above paragraph, which can be implemented individually or in any combination: the cleat extends parallel to a length of the speaker in one mounting position of the plurality of mounting positions; the cleat is angled relative to a length of the speaker in one mounting position of the plurality of mounting positions; a pad is secured to an upper surface of the cleat; a pad secured to an inner surface of the connecting portion; a fastener extends through the cleat and is configured to extend at least partially through the speaker, the fastener engages the cleat in a loose position in which the cleat is rotatable relative to the speaker and in a tightened position in which the cleat is inhibited from rotating relative to the speaker; the cleat is rotatable about the fastener when the fastener is in the loose position; the cleat is rotatable 360 degrees when the fastener is in the loose position; the cleat includes an upper surface, a lower surface, and a slot, the slot is located between the upper surface and the lower surface and extends along a length of the cleat; a clamp fastener extends through the end portions of the clamp and through the slot of the cleat, the clamp fastener engages the clamp in a loose state in which the clamp is slidable relative to the cleat and in a tightened state in which the clamp is inhibited from sliding relative to the cleat; a cleat fastener extends through the cleat and is configured to extend at least partially through the speaker, the cleat fastener engages the cleat in a loose position in which the cleat is rotatable relative to the speaker and in a tightened position in which the cleat is inhibited from rotating relative to the speaker, the cleat fastener extends perpendicular to the clamp fastener; and the end portions of the clamp are perpendicular to a top surface of the speaker and the connecting portion of the clamp is arcuate.

In another form, the present disclosure provides a speaker system that includes a speaker and a pair of mounting brackets. The pair of mounting brackets are spaced apart from each other and are configured to be mounted to the speaker. Each mounting bracket of the pair of mounting brackets includes a cleat and a clamp. The cleat is configured to rotate relative to the speaker and includes an upper surface, a lower surface, and a slot. The slot is located between the upper surface and the lower surface and extends along at least a portion of the cleat. The clamp slidably engages the cleat among a plurality of positions. The clamp includes end portions and a connecting portion. The end portions are spaced apart from each other and engage the cleat proximate the slot. The connecting portion is disposed between the end portions and is configured to receive a support bar.

In variations of the speaker system of the above paragraph, which can be implemented individually or in any combination: one mounting bracket of the pair of mounting brackets is mounted proximate a first end of the speaker and the other mounting bracket of the pair of mounting brackets is mounted proximate a second end of the speaker that is opposite the first end; the connecting portion of each clamp is arcuate; each pad of a pair of pads is located between the lower surface of a respective mounting bracket of the pair of mounting brackets and the speaker; each pad of a pair of pads is located on the connecting portion of a respective clamp; each clamp fastener of a pair of clamp fasteners extends through the end portions of the clamp of a respective mounting bracket of the pair of mounting brackets and through the slot of the cleat of the respective mounting bracket of the pair of mounting brackets, the clamp fastener engages the clamp in a loose state in which the clamp is slidable relative to the cleat and in a tightened state in which the clamp is inhibited from sliding relative to the cleat; and each cleat fastener of a pair of cleat fasteners extends through the cleat of a respective mounting bracket of the pair of mounting brackets and is configured to extend at least partially through the speaker, the cleat fastener engages the cleat in a loose position in which the cleat is rotatable relative to the speaker and in a tightened position in which the cleat is inhibited from rotating relative to the speaker.

In yet another form, the present disclosure provides a speaker system that includes a speaker and a pair of mounting brackets. The pair of mounting brackets are spaced apart from each other and are mounted to an exterior surface of the speaker. Each mounting bracket of the pair of mounting brackets includes a cleat, a clamp, a pair of clamp fasteners, and a pair of cleat fasteners. The cleat includes an upper surface, a lower surface, and a slot. The slot located between the upper surface and the lower surface and extending along at least a portion of the cleat. The clamp includes end portions and a connecting portion. The end portions are spaced apart from each other and engage the cleat proximate the slot. The connecting portion is disposed between the end portions and is configured to receive a support bar. Each clamp fastener extends through the end portions of the clamp of a respective mounting bracket of the pair of mounting brackets and through the slot of the cleat of the respective mounting bracket of the pair of mounting brackets. The clamp fastener engages the clamp in a loose state in which the clamp is slidable relative to the cleat and in a tightened state in which the clamp is inhibited from sliding relative to the cleat. Each cleat fastener extends through the cleat of a respective mounting bracket of the pair of mounting brackets and at least partially through the speaker. The cleat fastener engages the cleat in a loose position in which the cleat is rotatable relative to the speaker and in a tightened position in which the cleat is inhibited from rotating relative to the speaker. The pair of cleat fasteners extend perpendicular to the pair of clamp fasteners.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
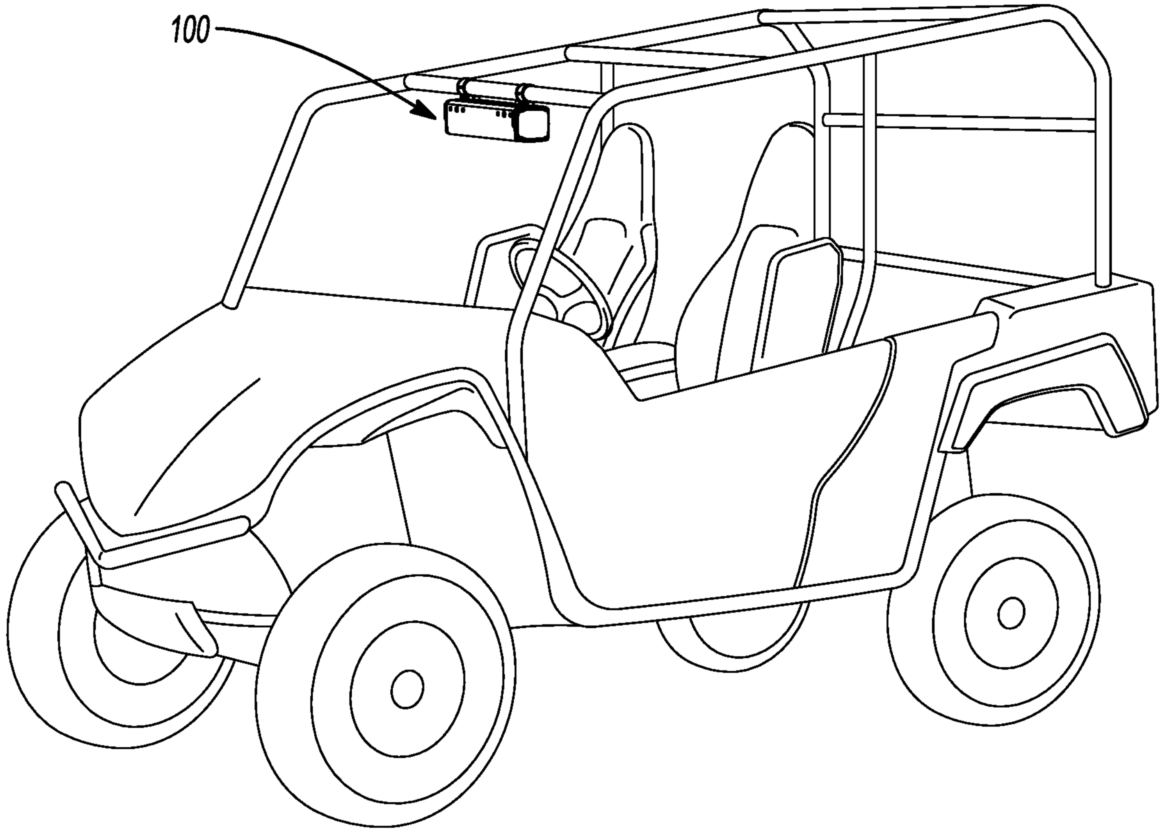
FIG. 1 is a perspective view of a speaker system including mounting brackets secured to a movable structure according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure relates to a speaker system having mounting brackets and a casing housing one or more speakers. The mounting brackets are configured to be mounted to at least one side of the speaker casing at various mounting positions and angles. In this way, the speaker system can be used in various applications where the mounting brackets mount the speaker system to a structure based on a desired position.

With reference to FIG. 1, a speaker system 100 may be used in various applications where the speaker system 100 may be mounted to a movable structure such as an all-terrain vehicle (ATV) as shown in the figure. As used herein, the term "movable structure" refers to a structure that is used to transport people, goods, or equipment, for example, from one location to another. In some embodiments, the speaker system 100 may be used in other vehicle applications where the movable structure is an off-road vehicle (e.g., dirt bike, sand rail, rock crawler, etc.) or a motorcycle, for example. In other embodiments, the speaker system 100 may be used in watercraft applications where the moveable structure is a boat or personal watercraft, for example. As used herein, the term "watercraft" refers to any vessel configured for water transport and/or activity. The speaker system 100 may be retrofitted into the movable structure, for example, or may be installed in the movable structure while it is being manufactured. In still yet other embodiments, the speaker system 100 may be mounted to stationary structures such as residential dwellings, for example.

Figure 2:
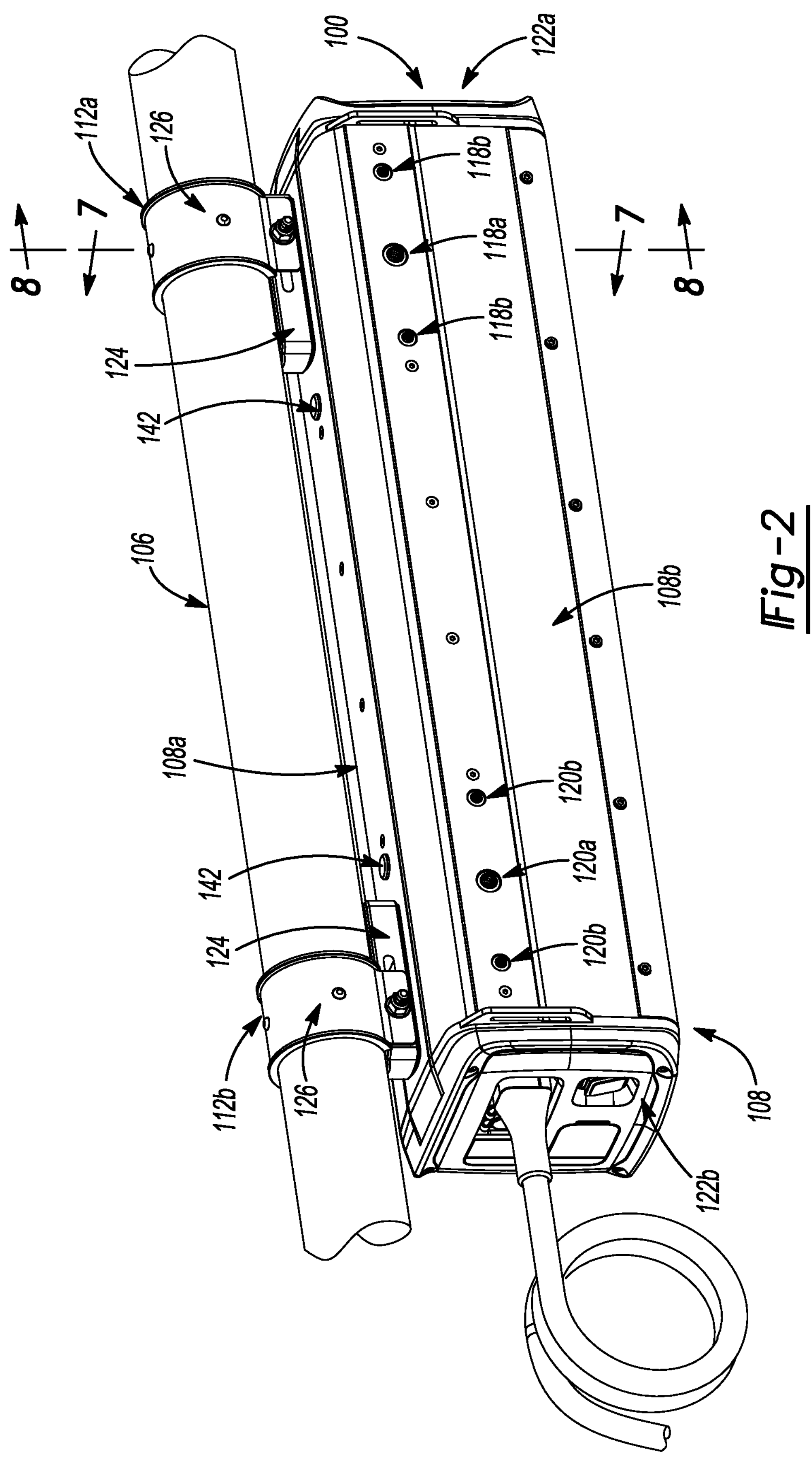
FIG. 2 is a perspective view of the speaker system of FIG. 1 showing the mounting brackets secured to a top side of a casing of the speaker system.
Figures 3A, 3B, 3C:
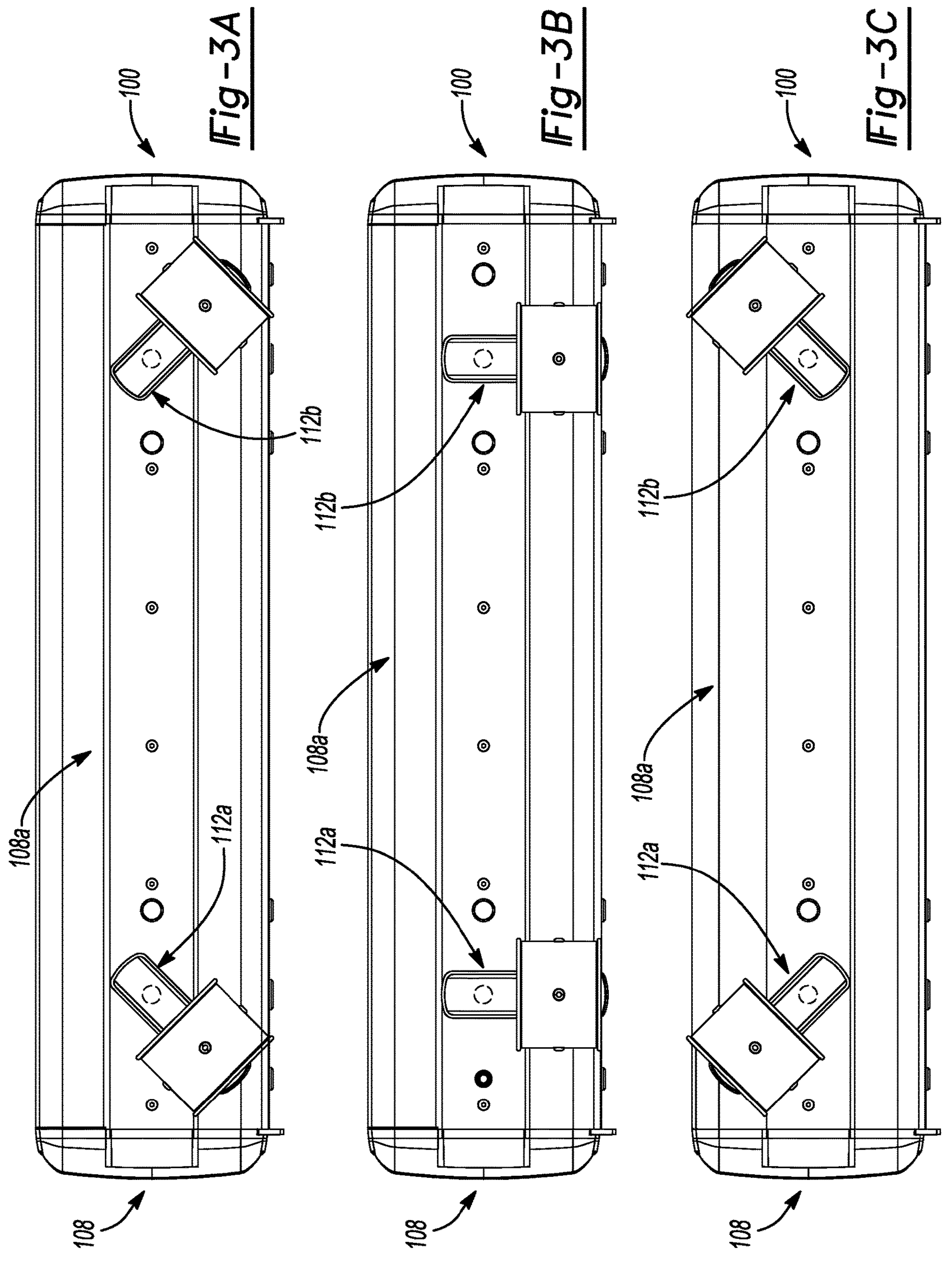
FIGS. 3A-3C are top views of the speaker system of FIG. 1 showing the mounting brackets rotated among a plurality of positions relative to the casing of the speaker system.
Figure 4:
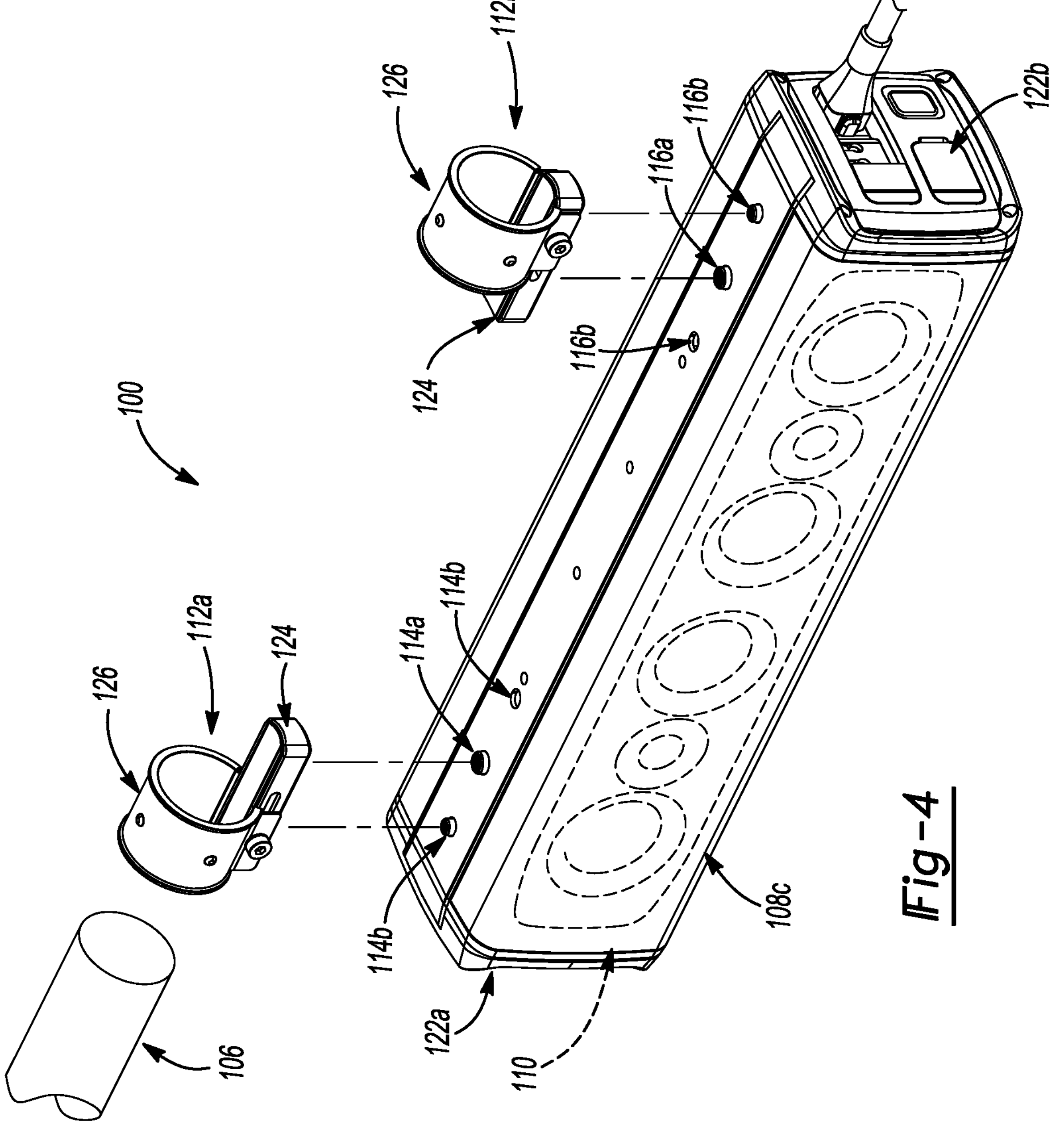
FIG. 4 is an exploded perspective view of the speaker system of FIG. 1.
Figure 5:
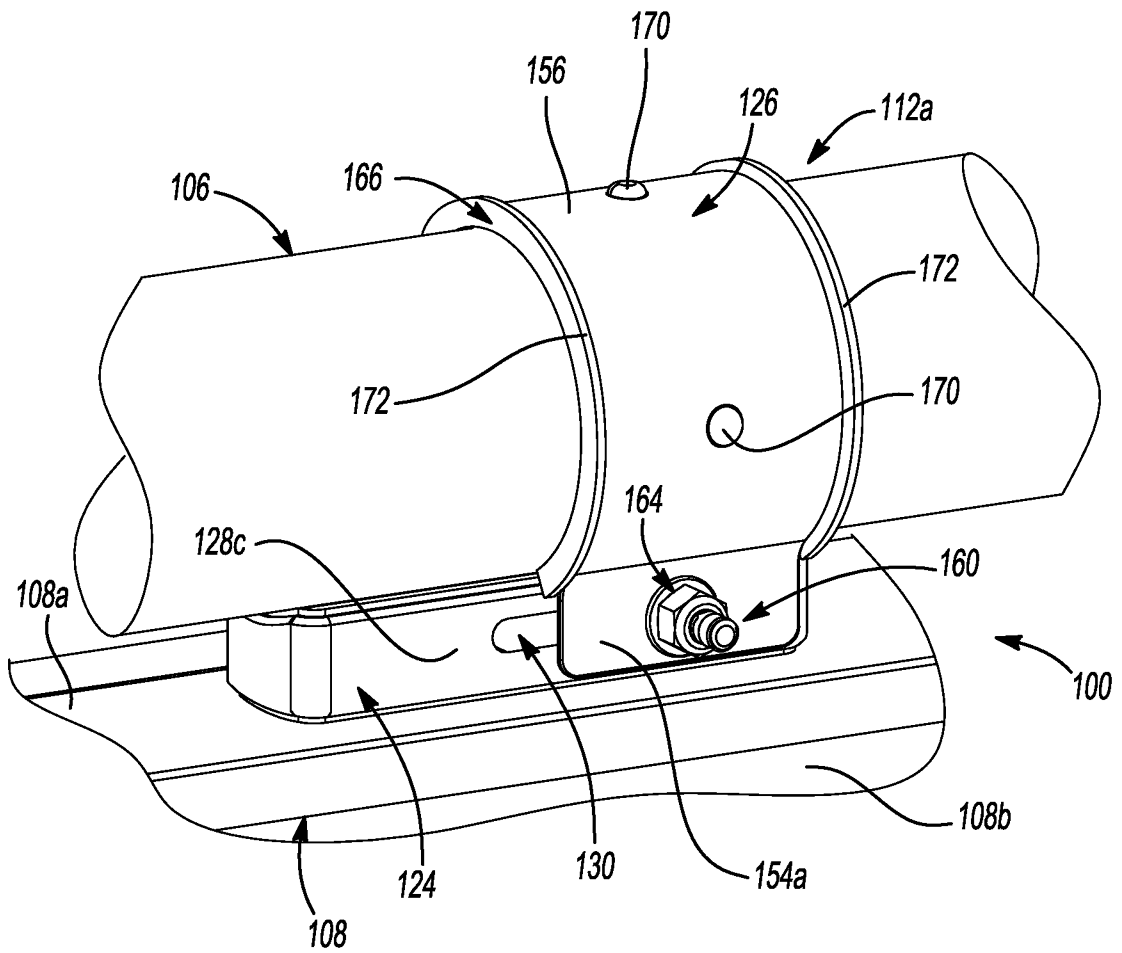
FIG. 5 is a perspective view of one mounting bracket of the speaker system of FIG. 1.

With additional reference to FIGS. 2 and 4, the speaker system 100 may be an all-in-one system that includes a casing 108, one or more speakers 110, an audio signal receiver (not shown; e.g., wireless receiver for receiving audio signals, such as radio signals, Bluetooth® signals, Wi-Fi signals, for example), at least one optional amplifier (not shown), and a plurality of mounting brackets 112*a*, 112*b*. In this way, the speaker system 100, when installed in the movable structure, for example, may be operationally independent from a stereo system of the movable structure. The speaker system 100 may have minimal wiring and, particularly in one form, has only a single jacket cable with power wires (e.g., hot and neutral wires) and optionally may include a ground wire and, if applicable, LED lighting wires. In yet another embodiment, the speaker system 100 may be void of its own audio signal receiver and/or an amplifier. In such embodiment, the speaker system 100 may be electrically coupled (e.g., wired connection) to a stereo system of the movable structure, for example, when installed therein or alternatively to another device within the movable structure that has its own audio signal source or receiver. In some embodiments, the speaker system 100 may include one or more additional components such as an audio source unit (e.g., a hard drive and processor for locally storing and playing music files), a light source (e.g., light emitting diodes), auxiliary input ports (e.g., for connecting an MP3 player, phone, or memory stick), and auxiliary output ports (e.g., to go to an external amplifier for a subwoofer or additional speakers). In some cases, the auxiliary input and output ports may be used to connect multiple audio systems together.

In other embodiments, the speaker system 100 may include a battery or a battery pack (not specifically shown), or be configured to receive one or more removable batteries. In this way, the speaker system 100 may be used independent of a main battery of the movable structure, thereby inhibiting use of the main battery to operate or charge the speaker system 100. In some embodiments, the speaker system 100 may be electrically coupled to a main battery of the movable structure. Thus, the speaker system 100 does not need to be removed from the movable structure to charge or operate it. An example of a suitable battery pack is a lithium ion battery pack, but other types of batteries may be used.

The casing 108 includes one or more panels that form a watertight compartment that houses the speakers 110. The casing 108 includes at least one set of mounting apertures on a corresponding side of the casing 108. In the example illustrated, the casing 108 includes a first set of top mounting apertures 114*a*, 114*b* (FIG. 4), a second set of top mounting apertures 116*a*, 116*b* (FIG. 4), a first set of rear mounting apertures 118*a*, 118*b* (FIG. 2), and a second set of rear mounting apertures 120*a*, 120*b* (FIG. 2), though more or fewer sets of mounting apertures can be used.

The top mounting apertures 114*a*, 114*b* of the first set are formed in a top side 108*a* of the casing 108 and are located proximate end 122*a* of the casing 108. In the example illustrated, the top mounting apertures 114*a*, 114*b* of the first set are spaced apart from each other and are aligned with each other along a length of the casing 108. Each top mounting aperture 114*a* may be greater in size than each top mounting aperture 114*b* and is located between two top mounting apertures 114*b*. The top mounting apertures 116*a*, 116*b* of the second set are formed in the top side 108*a* of the casing 108 and are located proximate end 122*b* of the casing 108 that is opposite end 122*a*. The top mounting apertures 116*a*, 116*b* of the second set are also spaced apart from each other and are aligned with each other along the length of the casing 108. Each top mounting aperture 116*a* may be greater in size than each top mounting aperture 116*b* and is located between two top mounting apertures 116*b*.

The rear mounting apertures 118*a*, 118*b* of the first set are formed in a rear side 108*b* of the casing 108 and are located proximate end 122*a* of the casing 108 (i.e., the rear side 108*b* of the casing is opposite a front side 108*c* of the casing 108 where sound from the speakers 110 are emitted from). In the example illustrated, the rear mounting apertures 118*a*, 118*b* of the first set are spaced apart from each other and are aligned with each other along the length of the casing 108. Each rear mounting aperture 118*a* may be greater in size than each rear mounting aperture 118*b* and is located between two rear mounting apertures 118*b*. The rear mounting apertures 120*a*, 120*b* of the second set are formed in the rear side 108*b* of the casing 108 and are located proximate end 122*b* of the casing 108. In the example illustrated, the rear mounting apertures 120*a*, 120*b* of the second set are spaced apart from each other and are aligned with each other along the length of the casing 108. Each rear mounting aperture 120*a* may be greater in size than each rear mounting aperture 120*b* and is located between two rear mounting apertures 120*b*. Plugs 142 may be inserted into the apertures 114*a*, 114*b*, 116*a*, 116*b*, 118*a*, 118*b*, 120*a*, 120*b* when the apertures 114*a*, 114*b*, 116*a*, 116*b*, 118*a*, 118*b*, 120*a*, 120*b* are not in use.

With reference to FIGS. 5-8, the mounting brackets 112*a*, 112*b* are secured to the casing 108 and are secured to the movable structure, for example. In some embodiments, the mounting brackets 112*a*, 112*b* may be secured to one or more support bars 106 of the movable structure such that the casing 108 and the speakers 110 are suspended from the movable structure. For example, in applications where the movable structure is a vehicle, the support bar 106 may be an upper bar of a windshield frame or a front roll bar. In another example, where the movable structure is a watercraft, the support bar 106 may be handle bars, a windshield frame, or what is commonly called a wakeboard/ski tower.

Each mounting bracket 112*a*, 112*b* includes a cleat 124 and a clamp 126. The cleat 124 is configured to be mounted to the casing 108 in a plurality of mounting positions. In the example illustrated in FIG. 2, the cleat 124 of the mounting bracket 112*a* is mounted to the first set of top mounting apertures 114*a*, 114*b*.

With reference to FIGS. 5-8, the cleat 124 of the mounting bracket 112*a* includes an upper surface 128*a* (FIG. 6), a lower surface 128*b* (FIG. 6) that is opposite the upper surface 128*a*, and lateral sides 128*c*, 128*d*. In the example illustrated, the upper surface 128*a* has an arcuate shape and is concave such that it is recessed toward the lower surface 128*b*. In some embodiments, the upper surface 128*a* may have a flat shape or any other shape that corresponds to an external profile of the support bar 106.

Figure 6:
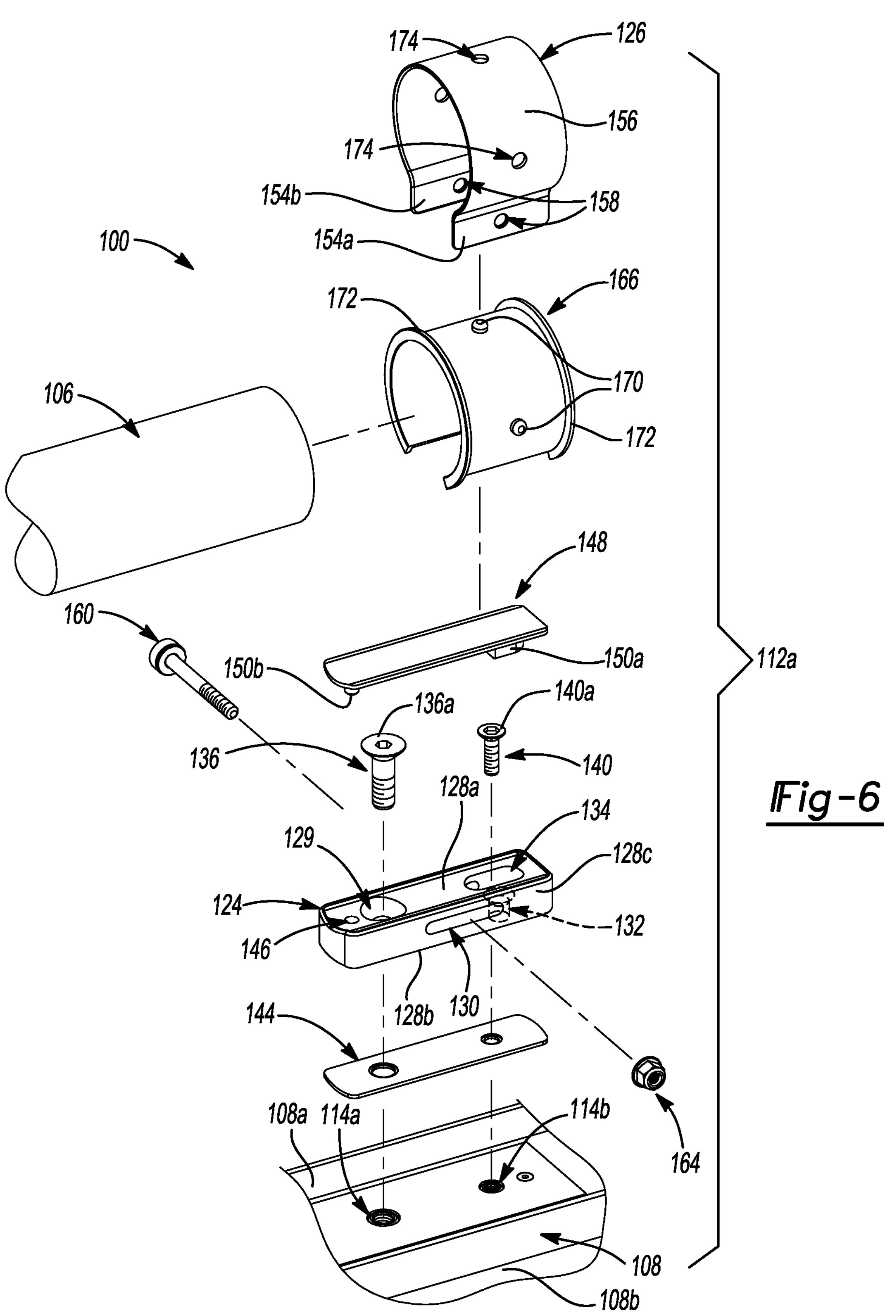
FIG. 6 is an exploded perspective view of one mounting bracket of the speaker system of FIG. 1.
Figure 7:
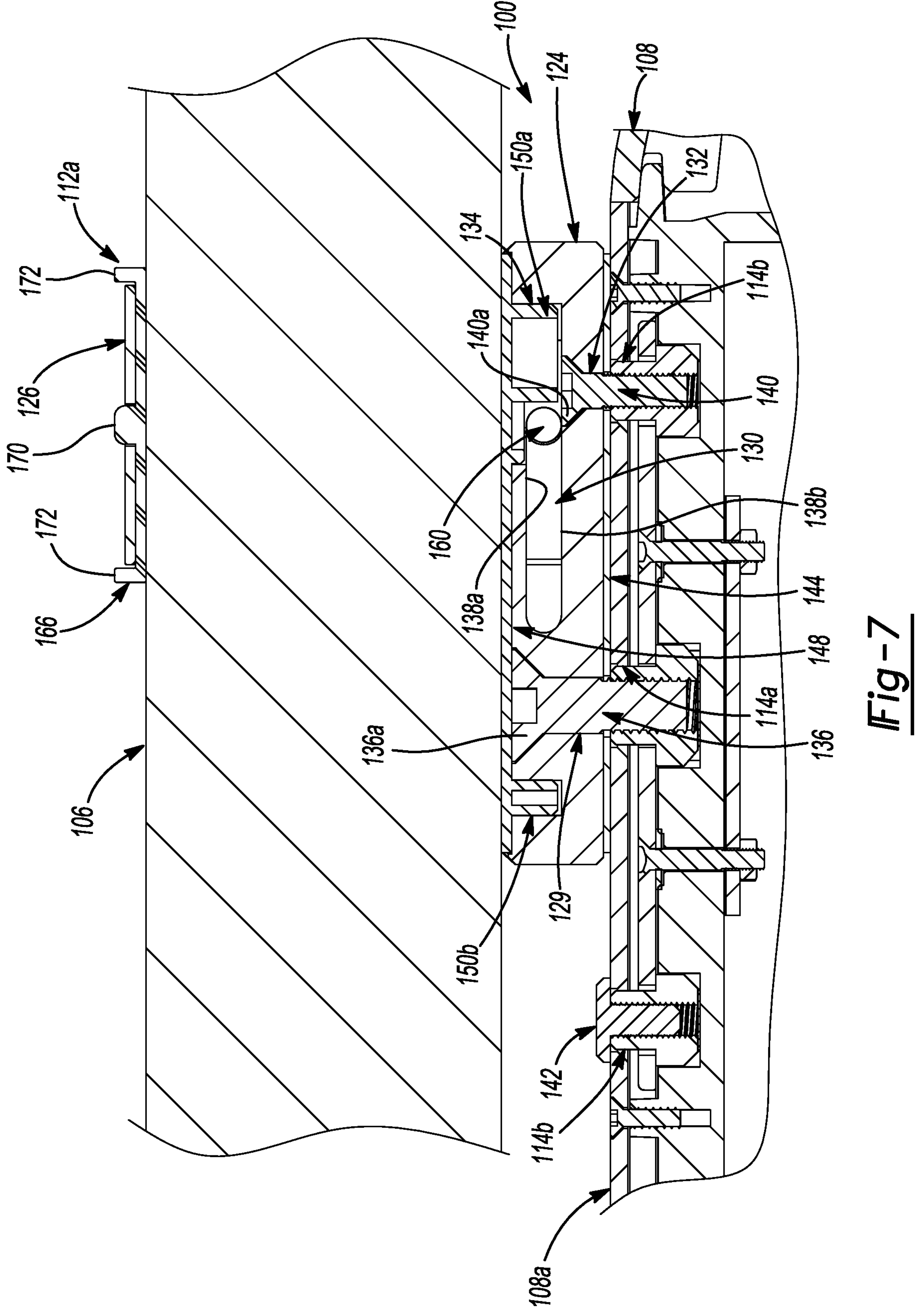
FIG. 7 is a cross-sectional view of one mounting bracket of the speaker system of FIG. 1, taken along line 7-7 of FIG. 2.
Figure 8:
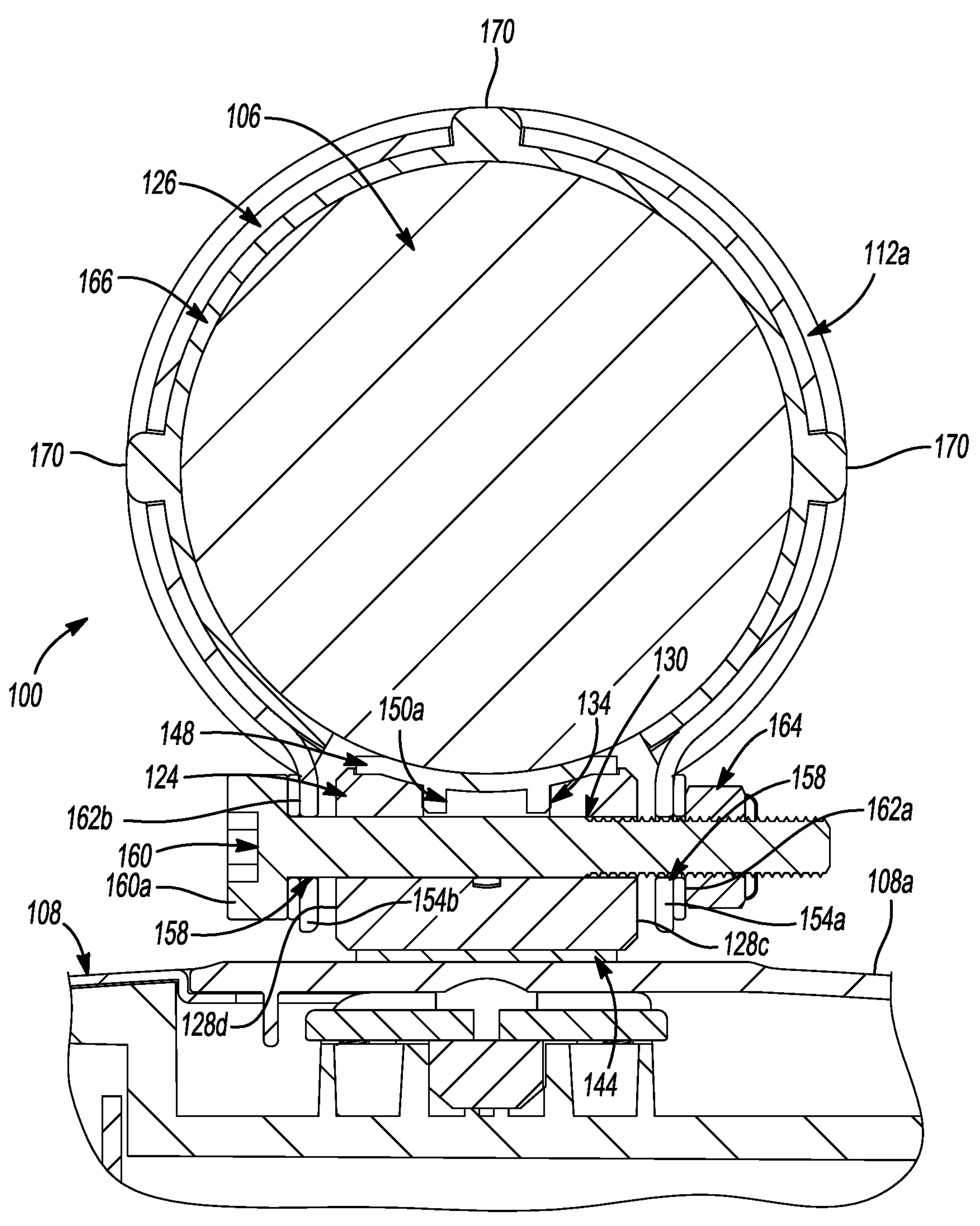
FIG. 8 is a cross-sectional view of one mounting bracket of the speaker system of FIG. 1, taken along line 8-8 of FIG. 2.

The cleat 124 of the mounting bracket 112*a* also includes a primary mounting aperture 129 (FIGS. 6 and 7), an elongated slot 130, a secondary mounting aperture 132 (FIGS. 6 and 7), and may include an aperture 134 (FIGS. 6 and 8). The primary mounting aperture 129 may be greater in size than the secondary mounting aperture 132 and extends from the upper surface 128*a* of the cleat 124 to the lower surface 128*b* of the cleat 124. The primary mounting aperture 129 is also configured to be aligned with a respective mounting aperture (e.g., mounting aperture 114*a*) of the casing 108 based on the desired position of the mounting bracket 112*a*. In this way, a fastener 136 (FIGS. 6 and 7) such as a threaded screw or locking pin, for example, may extend through the primary mounting aperture 129 and at least partially through the casing 108 to secure the cleat 124 of the mounting bracket 112*a* to the casing 108. A head 136*a* of the fastener 136 may be positioned below the upper surface 128*a* of the cleat 124 or may be flush with the upper surface 128*a* of the cleat 124. With reference to FIGS. 2 and 3A-3C, the fastener 136 is configured to engage the cleat 124 in a loose position or state (i.e., received through the primary mounting aperture 129 and loosely engaging the casing 108) in which the cleat 124 is rotatable relative to the casing 108 and in a tightened position or state (i.e., received through the primary mounting aperture 129 and tightly engaging the casing 108) in which the cleat 124 is inhibited from rotating relative to the casing 108. It should be understood that the cleat 124 is rotatable 360 degrees about the fastener 136 when the fastener 136 is in the loose position.

With reference back to FIGS. 5-8, the elongated slot 130 extends from the lateral side 128*c* of the cleat 124 to the lateral side 128*d* of the cleat 124 that is opposite the lateral side 128*c*. The elongated slot 130 is also located between the upper surface 128*a* of the cleat 124 and the lower surface 128*b* of the cleat 124 and extends lengthwise along a length of the cleat 124. The elongated slot 130 is partially defined by an upper intermediate surface 138*a* (FIG. 7) of the cleat 124 that is below the upper surface 128*a* and a lower intermediate surface 138*b* (FIG. 7) of the cleat 124 that is above the lower surface 128*b*.

The secondary mounting aperture 132 extends through the lower surface 128*b* of the cleat 124 and is directly or indirectly open through the upper surface 128*a*. The secondary mounting aperture 132 is also configured to be aligned with a respective mounting aperture 114*b* of the casing 108 when the primary mounting aperture 129 is aligned with the mounting aperture 114*a*. In this way, a fastener 140 such as a threaded screw or locking pin, for example, may extend through secondary mounting aperture 132 and at least partially through the casing 108 to lock the mounting bracket 112*a* in a position where the mounting bracket 112*a* extends parallel to the length of the casing 108. A head 140*a* of the fastener 140 may be positioned below the upper surface 128*a* or may be flush with the upper surface 128*a*. In the example provided, the head 140*a* of the fastener 140 is positioned below the lower intermediate surface 138*b* of the cleat 124 or may be flush with the lower intermediate surface 138*b* of the cleat 124.

A lower pad 144 may be disposed between the lower surface 128*b* of the cleat 124 and a top side 108*a* of the casing 108. In one form, this lower pad 144 may be a resilient material (e.g., rubber, resilient polymer, or foam) to provide cushioning and/or grip between the cleat 124 and the casing 108. The fastener 136 extending through the cleat 124 and at least partially through the casing 108 also extends through the lower pad 144. Similarly, the fastener 140 extending through the cleat 124 and at least partially through the casing 108 also extends through the lower pad 144. In this way, the lower pad 144 is secured between the cleat 124 and the top side 108*a* of the casing 108.

In the example provided, the secondary mounting aperture 132 is aligned with the elongated slot 130 such that the secondary mounting aperture 132 is open through the lower intermediate surface 138*b* of the cleat 124, though other configurations can be used, such as being independent of the elongated slot 130. In the example provided, the aperture 134 is located in the upper surface 128*a* of the cleat 124 and provides access to the secondary mounting aperture 132. In this way, the fastener 140 may conveniently be inserted through the aperture 134 and into the secondary mounting aperture 132. In the example illustrated, the aperture 134 has an oblong shape. In some embodiments, the aperture 134 may have a circular shape, square shape, or any other suitable shape to provide access to the second mounting aperture 132.

In the example illustrated, an upper pad 148 may be disposed on the upper surface 128*a* of the cleat 124 such that it covers substantially the entire upper surface 128*a* of the cleat 124. The upper pad 148 includes a plurality of protrusions 150*a* 150*b* that extend downwardly into apertures in the upper surface 128*a*, to removably secure the upper pad 148 onto the upper surface 128*a* of the cleat 124. In the example provided, one or more pad apertures 146 are formed in the upper surface 128*a* of the cleat 124 such that protrusion 150*a* extends into aperture 134 and protrusion 150*b* extends into aperture 146, though other configurations can be used, such as extending into primary mounting aperture 129, for example.

The upper pad 148 has a shape that corresponds to the shape of the upper surface 128*a*. That is, in the example illustrated, the upper pad 148 is arcuate to match the arcuate shape of the upper surface 128*a* and the support bar 106.

The cleat 124 of the mounting bracket 112*b* is configured to be mounted to the second set of top mounting apertures 116*a*, 116*b* in a plurality of mounting positions. The structure and function of the cleat 124 of the mounting bracket 112*b* may be similar or identical to the cleat 124 of the mounting bracket 112*a* described above, and therefore, will not be described again in detail.

With continued reference to FIGS. 5-8, the clamp 126 slidably engages the cleat 124 among a plurality of positions and is interchangeable such that clamps of various sizes may be connected to the cleat 124. The clamp 126 includes end portions 154*a*, 154*b* and a connecting portion 156. The end portions 154*a*, 154*b* are perpendicular to the top side 108*a* of the casing 108 (FIG. 2) and are proximate the elongated slot 130. Stated differently, the end portion 154*a* is located to overlap the elongated slot 130 at the lateral side 128*c* of the cleat 124 (FIG. 2) and the end portion 154*b* is located to overlap the elongated slot 130 at the lateral side 128*d* of the cleat 124 (FIG. 2). Each end portion 154*a*, 154*b* has an aperture 158 (FIGS. 6 and 8) extending therethrough. In this way, a fastener 160 such as a threaded locking pin or a threaded bolt, for example, extends through the apertures 158 of the end portions 154*a*, 154*b* and the elongated slot 130, thereby connecting the clamp 126 and the cleat 124 to each other. The fastener 160 engages the clamp 126 in a loose position or state in which the clamp 126 is slidable relative to the cleat 124 (i.e., the fastener 160 is allowed to traverse the elongated slot 130) and in a tightened position or state in which the clamp 126 is inhibited from sliding relative to the cleat 124 (i.e., the fastener 160 is inhibited from traversing the elongated slot 130).

An optional washer 162*a* (FIG. 8) may be positioned between the end portion 154*a* and a nut 164 threaded onto the fastener 160, and an optional washer 162*b* (FIG. 8) may be positioned between the end portion 154*b* and a head 160*a* of the fastener 160. The fastener 160 extends perpendicular to the fastener 136 extending through the cleat 124.

The connecting portion 156 is disposed between the end portions 154*a*, 154*b* and is configured to receive the support bar 106. The connecting portion 156 has a shape that corresponds to the support bar 106. For example, as shown in the figures, the connecting portion 156 has a generally cylindrical shape to correspond to the cylindrical shape support bar 106.

A pad 166 may be disposed on an inner surface of the connecting portion 156 such that it covers substantially an entire inner surface of the connecting portion 156. The pad 166 has a shape that corresponds to the shape of the connecting portion 156. That is, in the example illustrated, the pad 166 is generally cylindrical to match the generally cylindrical shape of the connecting portion 156 and the support bar 106. In the example illustrated, the pad 166 includes a plurality of protrusions 170 and/or lips 172 configured to secure the pad 166 to the connecting portion 156. In the example provided, the protrusions 170 are circumferentially spaced apart around the connecting portion 156. The protrusions 170 extend outward from the pad 166 into respective openings 174 (FIGS. 6 and 8) formed into the connecting portion 156. In the example provided, the lips 172 extend radially outward from each axial end of the pad 166 to inhibit axial movement of the pad 166 relative to the connecting portion. In this way, the pad 166 is removably secured to the connecting portion 156. The structure and function of the clamp 126 of the mounting bracket 112*b* may be similar or identical to the clamp 126 of the mounting bracket 112*a* described above, and therefore, will not be described again in detail.

Figure 9:
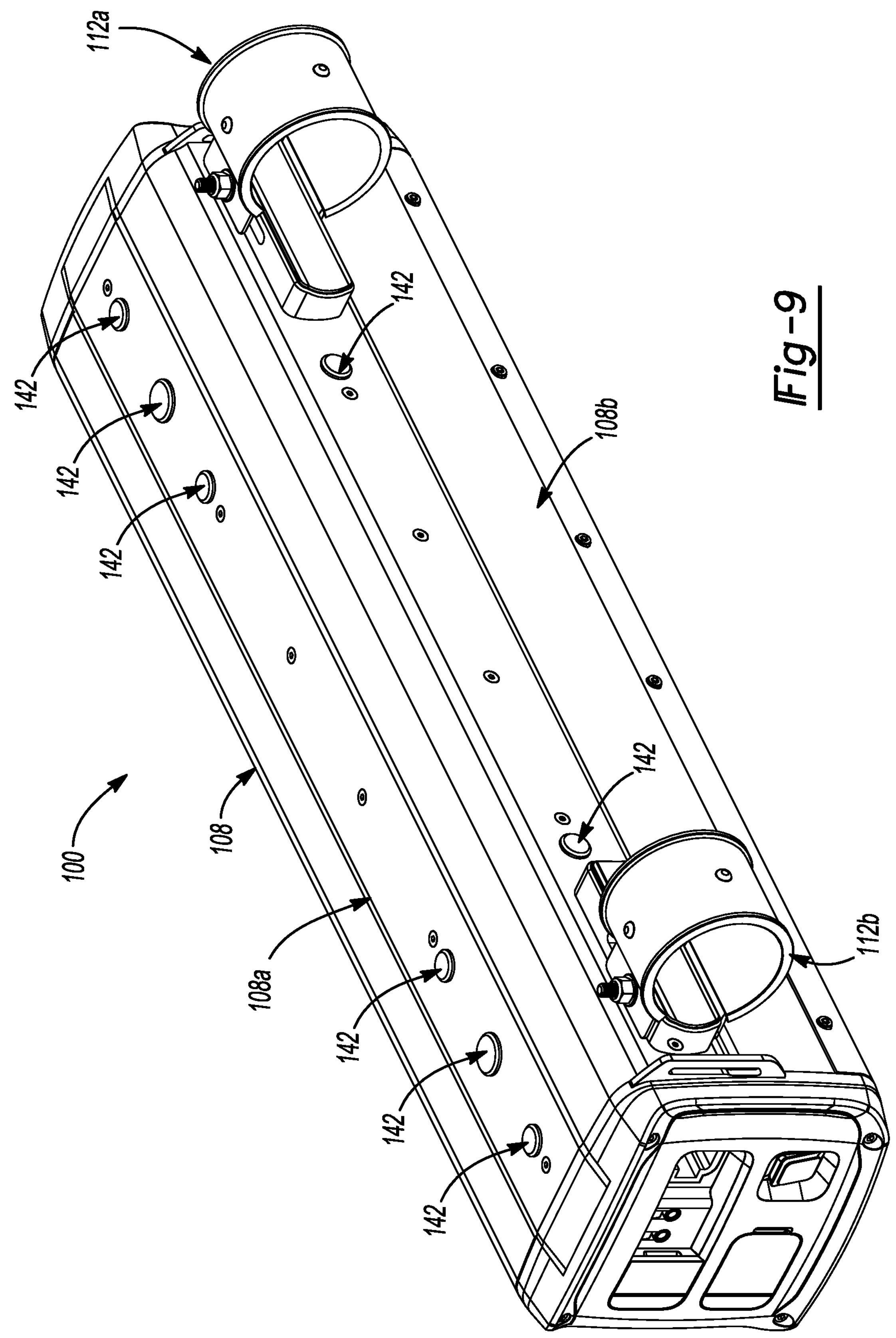
FIG. 9 is a perspective view of the speaker system of FIG. 1, showing the mounting brackets of the speaker system secured to a back side of the casing of the speaker system according to the principles of the present disclosure.

In another configuration, as shown in FIG. 9, the mounting bracket 112*a* can be mounted to the first set of rear mounting apertures 118*a*, 118*b* (FIG. 2) at the rear side 108*b* of the casing 108 and the mounting bracket 112*b* can be mounted to the second set of rear mounting apertures 120*a*, 120*b* (FIG. 2) at the rear side 108*b* of the casing 108. The structure and function of the mounting brackets 112*a*, 112*b* being mounted to the rear mounting apertures 118*a*, 118*b*, 120*a*, 120*b*, may be similar or identical to the mounting brackets 112*a*, 112*b* being mounted to the top side 108*a* of the casing 108, as described above, and, therefore, will not be described again in detail.

Unless otherwise expressly indicated herein, all numerical values indicating mechanical/thermal properties, compositional percentages, dimensions and/or tolerances, or other characteristics are to be understood as modified by the word “about” or “approximately” in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A speaker system comprising:
- a speaker; and
- a mounting bracket comprising:
  - a cleat configured to be mounted to the speaker in a plurality of mounting positions; and
  - a clamp movable between a loose state and a tightened state, the clamp secured to the cleat and configured to slide relative to the cleat among a plurality of positions in the loose state, the clamp including end portions and a connecting portion, the end portions spaced apart from each other and engaging the cleat, the connecting portion disposed between the end portions and configured to receive a support bar.

2. The speaker system of claim 1, wherein the cleat extends parallel to a length of the speaker in one mounting position of the plurality of mounting positions.

3. The speaker system of claim 1, wherein the cleat is angled relative to a length of the speaker in one mounting position of the plurality of mounting positions.

4. The speaker system of claim 1, further comprising a pad secured to an upper surface of the cleat.

5. The speaker system of claim 1, further comprising a pad secured to an inner surface of the connecting portion.

6. The speaker system of claim 1, further comprising a fastener extending through the cleat and configured to extend at least partially through the speaker, the fastener engages the cleat in a loose position in which the cleat is rotatable relative to the speaker and in a tightened position in which the cleat is inhibited from rotating relative to the speaker.

7. The speaker system of claim 6, wherein the cleat is rotatable about the fastener when the fastener is in the loose position.

8. The speaker system of claim 6, wherein the cleat is rotatable 360 degrees when the fastener is in the loose position.

9. The speaker system of claim 1, wherein the cleat includes an upper surface, a lower surface, and a slot, the slot is located between the upper surface and the lower surface and extends along a length of the cleat.

10. The speaker system of claim 9, further comprising a clamp fastener extending through the end portions of the clamp and through the slot of the cleat, the clamp fastener engages the clamp in the loose state in which the clamp is slidable relative to the cleat and in the tightened state in which the clamp is inhibited from sliding relative to the cleat.

11. The speaker system of claim 10, further comprising a cleat fastener extending through the cleat and configured to extend at least partially through the speaker, the cleat fastener engages the cleat in a loose position in which the cleat is rotatable relative to the speaker and in a tightened position in which the cleat is inhibited from rotating relative to the speaker, the cleat fastener extending perpendicular to the clamp fastener.

12. The speaker system of claim 1, wherein the end portions of the clamp are perpendicular to a top surface of the speaker and the connecting portion of the clamp is arcuate.

13. A speaker system comprising:
- a speaker; and
- a pair of mounting brackets spaced apart from each other and configured to be mounted to the speaker, each mounting bracket of the pair of mounting brackets comprising:
  - a cleat configured to rotate relative to the speaker and including an upper surface, a lower surface, and a slot, the slot located between the upper surface and the lower surface and extending along at least a portion of the cleat; and
  - a clamp movable between a loose state and a tightened state, the clamp secured to the cleat and configured to slide relative to the cleat among a plurality of positions in the loose state, the clamp including end portions and a connecting portion, the end portions spaced apart from each other and engaging the cleat proximate the slot, the connecting portion disposed between the end portions and configured to receive a support bar.

14. The speaker system of claim 13, wherein one mounting bracket of the pair of mounting brackets is mounted proximate a first end of the speaker and the other mounting bracket of the pair of mounting brackets is mounted proximate a second end of the speaker that is opposite the first end.

15. The speaker system of claim 13, wherein the connecting portion of each clamp is arcuate.

16. The speaker system of claim 13, further comprising a pair of pads, each pad of the pair of pads located between the lower surface of a respective mounting bracket of the pair of mounting brackets and the speaker.

17. The speaker system of claim 13, further comprising a pair of pads, each pad of the pair of pads located on the connecting portion of a respective clamp.

18. The speaker system of claim 13, further comprising a pair of clamp fasteners, each clamp fastener extending through the end portions of the clamp of a respective mounting bracket of the pair of mounting brackets and through the slot of the cleat of the respective mounting bracket of the pair of mounting brackets, the clamp fastener engages the clamp in the loose state in which the clamp is slidable relative to the cleat and in the tightened state in which the clamp is inhibited from sliding relative to the cleat.

19. The speaker system of claim 13, further comprising a pair of cleat fasteners, each cleat fastener extending through the cleat of a respective mounting bracket of the pair of mounting brackets and configured to extend at least partially through the speaker, the cleat fastener engages the cleat in a loose position in which the cleat is rotatable relative to the speaker and in a tightened position in which the cleat is inhibited from rotating relative to the speaker.

20. A speaker system comprising:

a speaker; and a pair of mounting brackets spaced apart from each other and mounted to an exterior surface of the speaker, each mounting bracket of the pair of mounting brackets comprising:

a cleat including an upper surface, a lower surface, and a slot, the slot located between the upper surface and the lower surface and extending along at least a portion of the cleat;

a clamp movable between a loose state and a tightened state, the clamp secured to the cleat and configured to slide relative to the cleat among a plurality of positions in the loose state, the clamp including end portions and a connecting portion, the end portions spaced apart from each other and engaging the cleat proximate the slot, the connecting portion disposed between the end portions and configured to receive a support bar;

a pair of clamp fasteners, each clamp fastener extending through the end portions of the clamp of a respective mounting bracket of the pair of mounting brackets and through the slot of the cleat of the respective mounting bracket of the pair of mounting brackets, the clamp fastener engages the clamp in the loose state in which the clamp is slidable relative to the cleat and in the tightened state in which the clamp is inhibited from sliding relative to the cleat; and a pair of cleat fasteners, each cleat fastener extending through the cleat of a respective mounting bracket of the pair of mounting brackets and at least partially through the speaker, the cleat fastener engages the cleat in a loose position in which the cleat is rotatable relative to the speaker and in a tightened position in which the cleat is inhibited from rotating relative to the speaker, the pair of cleat fasteners extending perpendicular to the pair of clamp fasteners.

* * * * *